Figure 1:
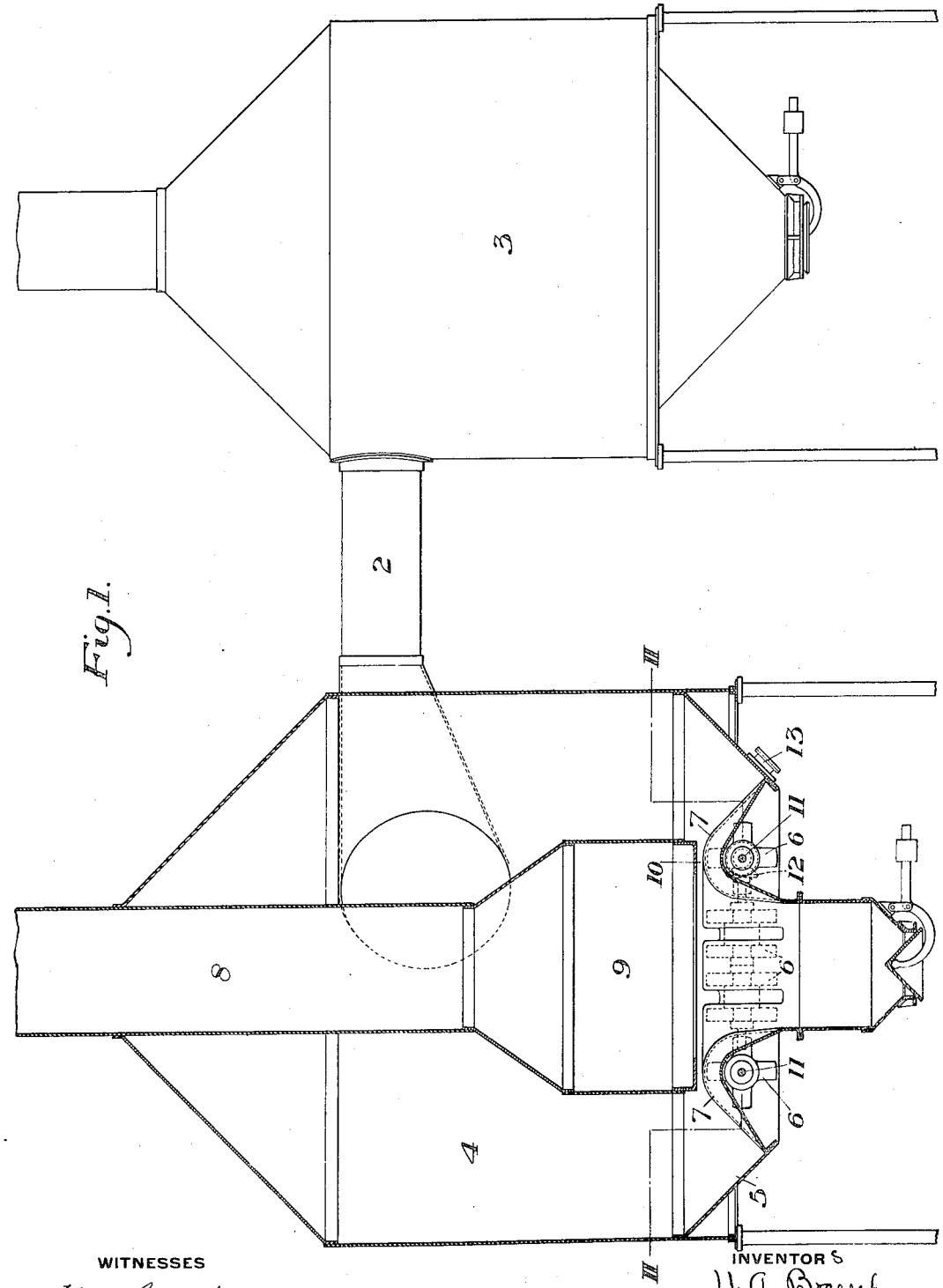

H. A. BRASSERT & R. W. COUSINS.
APPARATUS FOR AND METHOD OF CLEANING GASES.
APPLICATION FILED APR. 7, 1908.

1,070,398.

Patented Aug. 19, 1913.
2 SHEETS—SHEET 1.

WITNESSES
W.W. Swartz
R.A. Balderson

INVENTORS
H. A. Brassert
R. W. Cousins
by Bakewell, Byrnes & Parmelee
their attys.

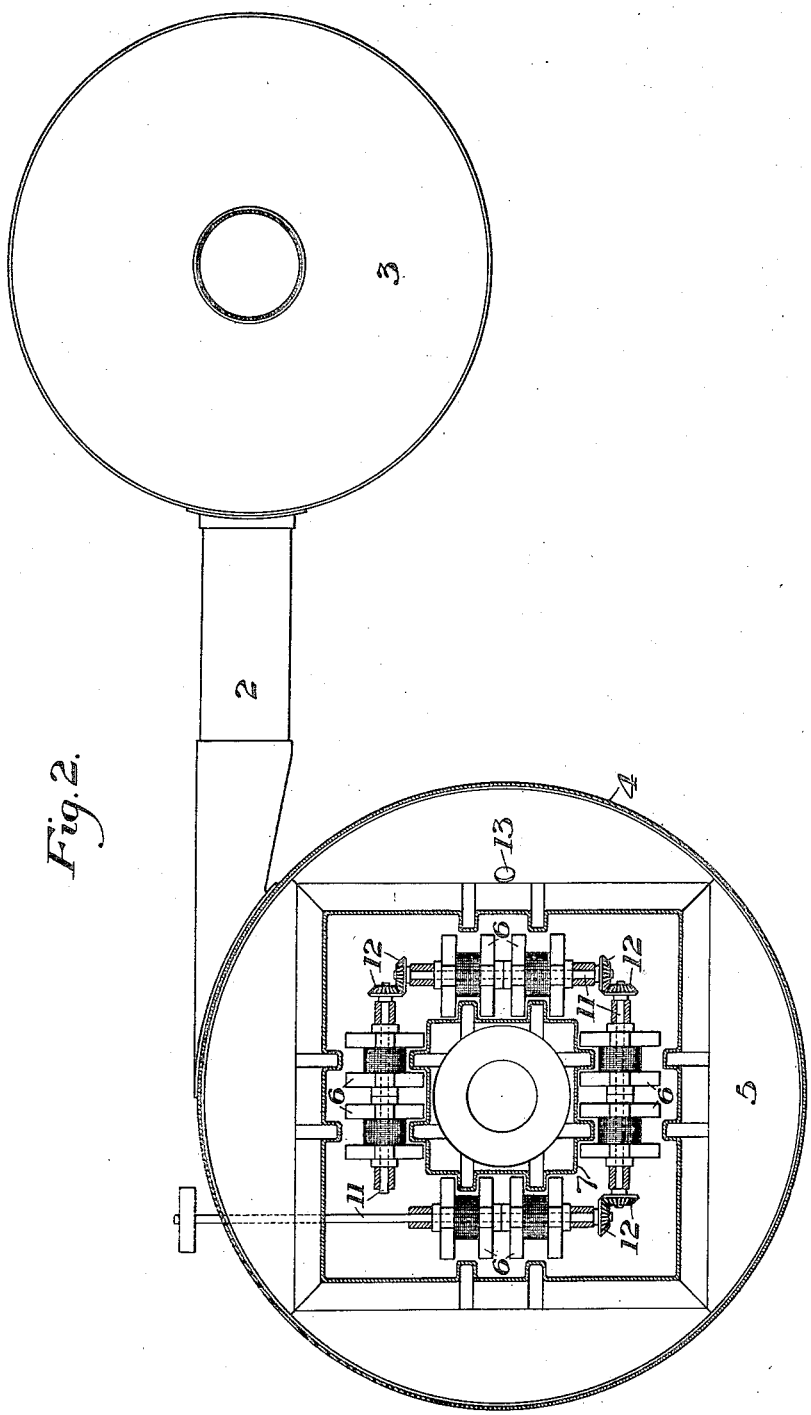

UNITED STATES PATENT OFFICE.

HERMAN A. BRASSERT AND ROBERT W. COUSINS, OF CHICAGO, ILLINOIS.

APPARATUS FOR AND METHOD OF CLEANING GASES.

1,070,398.

Specification of Letters Patent.  Patented Aug. 19, 1913.

Application filed April 7, 1908. Serial No. 425,781.

*To all whom it may concern:*

Be it known that we, HERMAN A. BRASSERT and ROBERT W. COUSINS, both of Chicago, Cook county, Illinois, have invented a new and useful Improvement in Apparatus for and Methods of Cleaning Gases, of which the following is a full, clear, and exact description, reference being had to the accompanying drawings, forming part of this specification, in which—

Figure 1 is a vetrical section of our apparatus; and Fig. 2 is a cross-section of Fig. 1 on the line II—II partly broken away.

Our invention relates to the cleaning of furnace gases containing magnetic material, or magnetic material mixed with other and non-magnetic material, in suspension therein, and is particularly applicable to blast-furnace gases.

Heretofore various methods have been in use for cleaning gases from furnaces or other sources, for the purpose of making them available for further industrial uses; such as dry dust catchers, in which the solids contained in the gases are deposited by expansion of the gas; or towers or flues fitted with baffle plates whereby a change of direction of the gas current and friction separates the solids from the gas; or scrubbers whereby the solids are eliminated through a filtering process; or by wet washing, whereby the solids are taken up in the water, sprayed into the gas or over the surface or baffle plates of suitable washing towers; or mechanical washers are employed in the shape of fans or other rotary machines which remove the dust by centrifugal force with or without the aid of water.

The dry methods have the disadvantage of not eliminating all of the finest particles of solids contained in the gas. The wet methods have the disadvantage either of a great deal of water being required in the stationary apparatus, or considerable mechanical power being necessary in the rotary machines. In our invention these disadvantages are obviated, since cleaning is effected by passing the gases through a magnetic field in such a manner that the magnetic particles carried by the gas, together with adhering non-magnetic particles, are separated out and disposed of.

The precise nature of our invention will be best understood by reference to the accompanying drawing in which is shown one form of apparatus suitable for carrying it out, it being premised, however, that the apparatus may be changed in various ways by those skilled in the art without departing from the invention as defined in the appended claims.

In these drawings the numeral 2 designates the downcomer pipe of a blast furnace, which is led through a dry dust catcher 3, this dust catcher being preferably unlined so that the gases in passing therethrough will be somewhat cooled by losing a portion of their contained heat.

4 is a supplementary dust catcher into the upper portion of which the downcomer pipe 2 opens in a tangential direction. Placed in the lower portion of this dust catcher 4 is a hopper shaped bottom 5, and underneath the central portion of it are arranged a series of electro magnets 6, these magnets being protected by shields or coverings 7 of brass or other non-magnetic material.

8 is the outlet pipe for the dust catcher 4 which extends centrally within the chamber thereof and which has an enlarged portion 9 at its lower end which terminates a short distance above the magnets, openings 10 being provided for the passage of the gases into pipe 8.

The magnets 6 may be arranged in various ways. In the drawing we have shown them as arranged in a square, and as mounted upon shafts 11 connected by gears 12 and arranged to be rotated in such a manner as to pull the solid particles around with them, the gases being subjected intermittently to the action of successive magnetic fields caused by the rotation of the magnets.

The operation is as follows:—The gases from the furnace go through the downcomer pipe 2 into the dry dust catcher 3 in which they are cooled to a sufficient degree to facilitate the extraction of the solid particles therefrom. In this dust catcher, a large portion of the coarser flue dust will be deposited. The gases then pass into the supplementary dust catcher 4. The gases then pass through the openings 10, and into the lower portion 9 of the outlet pipe 8, and in doing so pass through openings between opposite poles of the magnets. The magnets are thus caused to act upon the gases at a time when they are changing their direction of flow from a downward to a horizontal direction, and again from a horizontal to a vertical direction; and as the gases leave this magnetic field and ascend into the enlarged portion 9 of the outlet pipe, expansion is caused to take place on account of the fact that the cross-sectional area of the pipe 8 is greater than the combined cross-sectional areas of the openings 10, so that the action of the magnetic field is assisted by gravity and by expansion to extract the solid particles contained therein. By reason of the previous cooling of the gases in the dust catcher 3 a large portion of the moisture contained therein has been condensed to a vapor which moistens the solid particles contained in the gases, thus causing these magnetic particles to adhere to a large extent to non-magnetic particles contained in the gases, so that when the gases pass through the magnetic field, the magnets attract and thus hold in the magnetic field all the solids contained in the gases and pull them out of the direct path of the gases into a suitable receiving chamber 5, through which they may be removed by means of suitable capped openings such as shown at 13. The expansion of the gases, which takes place first in the dust catcher 3 then in the dust catcher 4 and finally directly after the gases pass through the openings 10, is owing to two factors: First, that in the dust catchers 3 and 4 the gases are cooled, thereby reducing their volume for a given pressure, or, since the volume remains constant, the pressure would be reduced, thereby causing expansion; and, second, the cross-sectional area of the outlet pipe 8 into which the gases finally pass is greater than that of the openings 10, so that the pressure of gases in said pipe is less than that of the gases as they pass through the openings 10, thus causing the expansion of the gases.

The magnets are preferably made, as shown, with projecting pole arms which concentrate the fields at these points thereby facilitating the particles being drawn out of the path of the gases.

While we describe and illustrate our invention in connection with the cleaning of blast furnace gases, it will be obvious that it can be applied to any kind of gas containing magnetic ingredients; also that various forms of apparatus may be used for carrying out the method, since

What we claim is:—

1. The method of separating magnetic particles from furnace gases, which consists in passing them through a magnetic field out of contact with the magnet, and causing subsequent expansion of the gases, substantially as described.

2. The method of separating magnetic particles from furnace gases, which consists in passing the gases through a magnetic field out of contact with the magnet and changing the direction of the flow of the gases as they pass into and leave such field, substantially as described.

3. The method of separating magnetic particles from furnace gases which consists in cooling the gases to an extent sufficient to condense moisture therein, and then passing the cooled gases through a magnetic field out of contact with the magnet, substantially as described.

4. The method of cleaning gases, which consists in first cooling them, thereby causing condensation of moisture contained therein, then passing them through a magnetic field, and causing an expansion of the gases after their passage through such field, substantially as described.

5. Apparatus for cleaning gases, consisting of a dust-catcher into which the gases are first conducted and in which they are partially cooled, a passage leading therefrom, and means for creating a magnetic field in a portion of said passage, said passage being arranged to change the direction of flow of the gases adjacent to the magnetic field, substantially as described.

6. Apparatus for cleaning gases consisting of a dust catcher into which the gases are first conducted and in which they are partially cooled, a passage leading therefrom, and means for creating a magnetic field in a portion of such passage, said passage being arranged to change the direction of flow of the gases adjacent to the magnetic field and also to cause an expansion thereof, substantially as described.

7. In apparatus for cleaning gases, means for first partially cooling the gases, a passage or conduit through which the partially cooled gases are conducted, a dust catcher connected with said passage, and magnets arranged to create a magnetic field within a portion of the dust catcher, substantially as described.

8. In apparatus for cleaning gases, means for first partially cooling the gases, a passage or conduit through which the partially cooled gases are conducted, a dust catcher connected with said passage, and magnets arranged to create a magnetic field within a portion of the dust catcher, said dust catcher being arranged to cause an expansion of the gases and also to change their direction of flow adjacent to the magnets, substantially as described.

9. Apparatus for separating magnetic particles from furnace gases, comprising a cooling chamber, a dust catcher communicating therewith, and a series of magnets arranged within the dust catcher to create a magnetic field through which the cooled gases are passed, substantially as described.

10. In apparatus for cleaning gases, a closed passage through which the gases are led, and a plurality of rotatable magnetic poles arranged to produce a rotating magnetic field in a portion of such passage, substantially as described.

11. In apparatus for cleaning gases, a passage through which the gases are led, and means for producing a rotating magnetic field in a portion of such passage, substantially as described.

12. In apparatus for cleaning gases, means for producing a rotating magnetic field, and a non-magnetic shield, said means being separated from the path of the gases by said shield, substantially as described.

13. The method of treating furnace gases which consists in passing them through a magnetic field having a non-magnetic shield therein, thereby attracting magnetic particles to said shield, and moving said magnetic field thereby causing the discharge of said magnetic particles from said shield, substantially as described.

14. The method of treating gases which consists in passing them through a magnetic field having a non-magnetic shield, therein, thereby causing the magnetic particles in said gas to adhere to said shield, and rotating said magnetic field to cause the particles to be carried downwardly on said plate and discharged therefrom, substantially as described.

15. The method of treating gases which consists in passing said gases through a plurality of magnetic fields rotating in the same direction as the flow of gas thereby bringing the particles in said gas into contact with a non-magnetic shield located in the magnetic fields, rotation of the fields causing the magnetic particles to be carried along said shield and discharged therefrom, substantially as described.

16. The method of treating gases which consists in passing said gases through a magnetic field having a non-magnetic shield therein, thereby bringing said particles into contact with said shield and intermittently interrupting the action of the magnetic field, thus causing the particles to be discharged from said shield, substantially as described.

17. A gas cleaning apparatus comprising a source of magnetism, a non-magnetic shield between said source of magnetism and the gas, and means for rotating said magnetic source, thereby causing the magnetic particles in said gas to be attracted to said shield and carried along the same, substantially as described.

18. A gas cleaning apparatus comprising a plurality of magnets, means for rotating said magnets in a direction corresponding with the flow of said gas, a non-magnetic shield between said magnets and said gas, rotation of said magnets causing the magnetic particles in said gas to be attracted to the shield, then carried along and finally discharged from the same, substantially as described.

19. The method of treating furnace gases, which consists in conducting the gases from the furnace through a dust catcher in which a partial separation is effected by gravity and in which the temperature of the gases is appreciably reduced, and then passing the gases through a magnetic field and causing a further separation by action of such field, substantially as described.

20. The method of treating furnace gases, which consists in conducting the gases from the furnace through an unlined dust catcher, whereby the temperature of the gases will be reduced and a partial condensation of the moisture therein will be effected, together with a partial separation by gravity of the contained solid particles, and then leading the gases through a magnetic field, substantially as described.

21. The method of treating furnace gases, which consists in first causing a partial condensation of the contained moisture and then passing the gases through a magnetic field, substantially as described.

22. The method of treating furnace gases, which consists in first causing a partial condensation of the moisture contained in said gases, then reversing the direction of flow of said gases and subjecting the same to the action of a magnetic field, substantially as described.

23. The method of treating furnace gases under pressure, which consists in first causing a partial condensation of the moisture contained in said gases, suddenly releasing the pressure and reversing the direction of flow of said gases, and simultaneously subjecting said gases to the action of a magnetic field, thereby causing the separation from the gases of magnetic particles and other particles which are caused to adhere to said magnetic particles by the action of the condensed moisture, substantially as described.

24. The method of treating furnace gases under pressure, which consists in passing them through a dust catcher and causing therein a partial condensation of the moisture contained in said gases, suddenly releasing the pressure and reversing the direction of flow of said gases, and simultaneously subjecting said gases to the action of a magnetic field, thereby causing the separation from the gases of magnetic particles and other particles which are caused to adhere to said magnetic particles by the action of the condensed moisture, substantially as described.

25. The method of treating furnace gases, which consists in first causing a partial condensation of the moisture contained in said gases, mechanically removing a portion of the solids contained in said gases, reversing the direction of flow of said gases, and subjecting the same to the action of a magnetic field, substantially as described.

26. The method of treating furnace gases, which consists in first reducing the temperature of the gases, whereby a partial condensation of moisture takes place, mechanically removing a portion of the solids contained in said gases, reversing the direction of flow of said gases, and simultaneously subjecting said gases to the action of a magnetic field, thereby separating the magnetic and the adhering non-magnetic particles from said gases, substantially as described.

In testimony whereof, we have hereunto set our hands.

HERMAN A. BRASSERT.
ROBERT W. COUSINS.

Witnesses:
L. L. DRUMHELLER,
W. H. GEESMAN.